United States Patent [19]

Pinto

[11] Patent Number: 4,671,893
[45] Date of Patent: Jun. 9, 1987

[54] SYNTHESIS GAS

[75] Inventor: Alwyn Pinto, Middlesbrough, England

[73] Assignee: Imperial Chemical Industries Plc, London, England

[21] Appl. No.: 832,423

[22] Filed: Feb. 24, 1986

[30] Foreign Application Priority Data

Mar. 8, 1985 [GB] United Kingdom ............... 8506011
Nov. 22, 1985 [GB] United Kingdom ............... 8528854

[51] Int. Cl.$^4$ ................................................ C01C 1/04
[52] U.S. Cl. ................................ 252/376; 55/25; 55/26; 55/48; 55/68; 252/374; 423/359
[58] Field of Search ............... 55/25, 26, 48, 68; 252/374, 376; 423/359

[56] References Cited

U.S. PATENT DOCUMENTS

| | | | |
|---|---|---|---|
| 4,553,981 | 11/1985 | Fuderer | 423/650 |
| 4,572,829 | 2/1986 | Fuderer | 423/359 |
| 4,592,860 | 6/1986 | Fuderer | 252/376 |
| 4,624,841 | 11/1986 | Hidaki | 423/359 |

FOREIGN PATENT DOCUMENTS

EPB60199 3/1982 European Pat. Off. .
EPA157480 2/1985 European Pat. Off. .

Primary Examiner—John Doll
Assistant Examiner—Wayne A. Langel
Attorney, Agent, or Firm—Cushman, Darby & Cushman

[57] ABSTRACT

Carbon dioxide is removed from a raw gas containing hydrogen, carbon dioxide, and intermediate boiling gas, e.g. nitrogen, to give a gas suitable for use as a synthesis gas by a wet carbon dioxide removal process, and the resultant carbon dioxide depleted gas is subjected to pressure swing adsorption (PSA) to remove some, or all, of the intermediate boiling gas and the bulk of any residual carbon dioxide. The PSA waste gas is used to strip the absorbent liquid in the regeneration of the latter in the wet carbon dioxide removal process.

The process is of particular utility in the manufacture of ammonia synthesis gas from a raw gas containing an excess of nitrogen, particularly as prepared by primary/secondary reforming/shift of a carbonaceous feedstock with partial bypass of the primary reforming stage.

11 Claims, 1 Drawing Figure

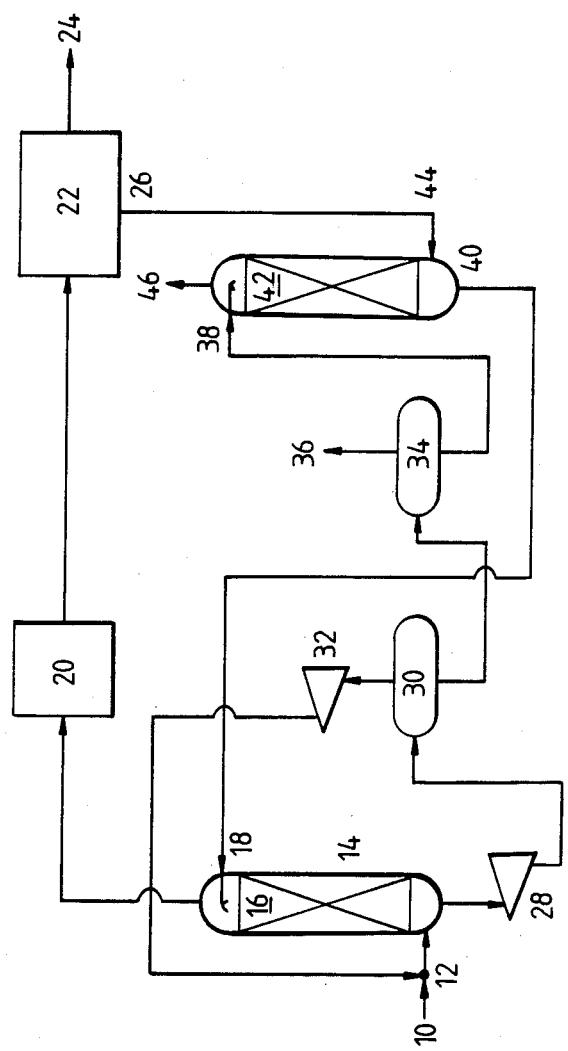

SYNTHESIS GAS

This invention relates to synthesis gas and in particular to a process for producing a hydrogen containing gas stream that is free of certain impurities and is suitable for use as synthesis gas.

The conventional process for producing hydrogen-containing gas streams such as pure hydrogen or ammonia synthesis gas, i.e. hydrogen in admixture with nitrogen, involves initial reaction of a carbonaceous feedstock with steam and/or oxygen, catalytic shift reaction to convert carbon monoxide to carbon dioxide, removal of carbon dioxide in an absorbent liquid, and removal of traces of carbon oxides by methanation or by a wash with liquid nitrogen. Such a process is not fully satisfactory as, inter alia, it requires considerable energy consumption in regenerating the absorbent employed for carbon dioxide removal, and/or it requires an external nitrogen supply. Consideration has been given to adsorptive removal of carbon dioxide and the unwanted gases in GB-A-2103199 and GB-A-2126573, but these processes have required (respectively) an unduly drastic departure from conventional technology or result in a relatively high wastage of hydrogen, and do not readily provide the carbon dioxide in a conveniently exportable state such as is needed when the carbon dioxide is to be reacted with synthesised ammonia to produce urea. Thus such processes cannot be adopted as modifications of existing operating plants.

We have now devised a process involving adsorptive hydrogen purification that is simple, moderate in capital cost and energy consumption and readily integrable into existing plants.

According to the invention there is provided a process for producing a hydrogen-containing gas stream from a raw gas stream comprising hydrogen, carbon dioxide, and other gas of intermediate boiling point, wherein carbon dioxide is removed from the raw gas stream in a wet carbon dioxide removal stage wherein, in one or more absorption steps, carbon dioxide is absorbed from the raw gas into an absorbent liquid to give a carbon dioxide-loaded absorbent liquid which is then passed to one or more regeneration steps wherein absorbed carbon dioxide is separated from the carbon dioxide-loaded absorbent liquid thereby regenerating said absorbent liquid which is returned to the absorption step or steps, characterised by:
(a) removing at least part of said other gas by a pressure swing adsorption process whereby to produce the required hydrogen-containing gas stream and waste gas, and
(b) in at least one of said one or more regeneration steps, contacting the carbon dioxide-loaded absorbent liquid with at least part of said waste gas so that the latter strips carbon dioxide from said carbon dioxide-loaded absorbent liquid to give the regenerated absorbent liquid.

The raw gas stream contains at least one other gas in addition to hydrogen and carbon dioxide. The other gas or gases, which have boiling points intermediate the boiling points of hydrogen and carbon dioxide, particularly include carbon monoxide and/or methane: such a raw gas may be obtained by steam reforming or partial oxidation of a carbonaceous feedstock and such reforming or partial oxidation is often followed by the catalytic shift process to convert carbon monoxide to carbon dioxide where the desired hydrogen-containing product gas stream is required to be essentially free of carbon monoxide. No such shift stage will generally be used where it is desired that the product gas stream has a substantial carbon monoxide content, e.g. where the product gas stream is to be used for methanol synthesis.

The raw gas may also contain steam, often as a result of the use of an excess of steam in such reforming and/or shift stages. In many cases it is desirable that the raw gas is cooled to condense such steam prior to the wet carbon dioxide removal stage to avoid excessive dilution of the absorbent liquid: however, as described hereinafter, in some cases such a condensation step may be unnecessary.

Where the raw gas is to be used for making ammonia synthesis gas, the nitrogen will generally be introduced before the carbon dioxide removal and so the raw gas will, in such cases, also contain nitrogen: also nitrogen and inerts such as argon will also be present where there is a secondary reforming or partial oxidation stage using air, or oxygen enriched air, as the oxygen-containing gas required in such processes. Ammonia synthesis gas manufacture usually employs such a secondary reforming stage to introduce nitrogen.

Where the process of the invention is used to prepare substantially pure hydrogen, the pressure swing adsorption (PSA) stage should be such as to remove substantially all the components, other than hydrogen, from the gas stream leaving the wet carbon dioxide removal stage. Such PSA processes are well established and need not be described further.

Where the process of the invention is used to prepare a hydrogen-containing gas stream also containing at least one other gas, e.g. carbon monoxide or nitrogen, for the satisfactory operation of the invention it is necessary that some gas, in addition to any residual carbon dioxide, is removed in the PSA stage. The raw gas therefore has to have such a composition, in relation to the desired hydrogen-containing product gas, that there is such a gas to be removed. The PSA adsorbent and conditions should be selected so that the hydrogen-containing product gas has the desired composition: for example, when used to make ammonia synthesis gas from a raw gas stream containing nitrogen, methane, inerts, e.g. argon, and, perhaps, carbon monoxide, in addition to hydrogen and carbon dioxide, the PSA conditions should be chosen to remove some or all of the methane, carbon monoxide, and/or inerts, and/or some of the nitrogen as well as the bulk of any remaining carbon dioxide A PSA process that can remove such intermediate boiling gases, together with carbon dioxide, is described in EP-A-157480. In the production of ammonia synthesis gas, if the raw gas contains carbon monoxide and the extent of carbon monoxide removal in the PSA stage is not very high, as occurs when the adsorbent is zeolite A or active carbon, and/or the carbon dioxide removal is not complete, a methanation step preferably follows the PSA stage. If the raw gas is carbon monoxide free or if the extent of carbon monoxide removal in the PSA stage is high, as may occur when the adsorbent is, for example, mordenite or otherwise has a much greater affinity for carbon monmoxide than nitrogen, and carbon dioxide removal is substantially complete, such a post PSA methanation step may be unnecessary. Post PSA methanation can also be avoided, where carbon dioxide removal is substantially complete, if the carbon monoxide content of the raw gas is very low, e.g. as the result of very thorough shifting or if a selective oxidation or methanation step is employed prior to the PSA stage, or if the ammonia synthesis catalyst is ruthenium and thus tolerant of carbon oxides. In the preferred processes for the production of ammonia synthesis gas, the carbon monoxide content of the raw gas is less than 1.0%, particularly less than 0.5% v/v on a dry basis.

Thus the process of the invention is of particular utility, as indicated above, for the production of synthesis gas suitable for the production of ammonia.

Conventionally ammonia synthesis gas is made from a desulphurised hydrocarbon feedstock by a sequence of stages including an externally heated primary steam reforming stage, a secondary reforming stage, catalytic shift, condensation of excess steam, wet carbon dioxide removal, and methanation.

Although the overall reaction in the reforming and shift stages requires less than two molecules of steam per feedstock carbon atom, i.e. a steam ratio of less than 2, in order to effect reforming without substantial carbon formation, the externally heated primary reforming stage is normally conducted using a substantial excess of steam: thus the steam ratio is generally in an excess of 2.5 and is normally 3 or more. This means however that a considerable amount of energy has to be employed to provide the necessary amount of steam and the excess of steam has subsequently to be condensed. The amount of steam required can be reduced by feeding part of the desulphurised feedstock directly to the secondary reforming stage, or to an adiabatic primary reforming stage between the externally heated primary reforming stage and the secondary reforming stage, so that part of the feedstock bypasses the externally heated primary reforming stage. In this way the latter stage can be operated at a steam ratio sufficiently high to avoid carbon formation but the overall amount of steam employed can be reduced. Examples of processes wherein there is such a partial bypass of an externally heated primary reforming stage are described in GB-A-1569014, GB-A-2126208, U.S. Pat. No. 3,278,452, and U.S. Pat. No. 4,296,085. In addition to reducing the amount of steam employed, such processes also have the advantage that a greater proportion of the reforming is effected in the thermally more efficient adiabatic (including secondary) reforming stage or stages than in conventional processes.

A consequence of the partial bypass of the externally heated primary reforming stage and hence an increased proportion of adiabatic reforming of the feedstock is that, unless oxygen-enriched air (which of course necessitates an air enrichment plant) is used in the secondary reforming stage, the amount of nitrogen introduced into the process gas is in a substantial excess of that required in the ammonia synthesis gas. While it is possible to feed the synthesis gas containing such a substantial excess of nitrogen to the ammonia synthesis loop and removing the excess of nitrogen after synthesis as described in EP-A-993, it is often convenient, particularly where there is substantial compression step after introduction of the excess of nitrogen, to remove the excess of nitrogen before such a compression step. Thus the excess of nitrogen can be removed after methanation and before compression and feeding of the synthesis gas to the synthesis loop. For example a cryogenic nitrogen removal stage after methanation is described in the aforesaid GB-A-2126208 and U.S. Pat. No. 4,296,085. In the present invention it is possible to remove the excess of nitrogen in the PSA stage.

Prior to methanation, the object of which is to convert carbon oxides, which de-activate ammonia synthesis catalysts, to methane, the bulk of the carbon monoxide in the process gas leaving the secondary reforming stage is converted to carbon dioxide by the shift reaction, and the bulk of the carbon dioxide produced in the reforming and shift stages is removed. The latter is normally done by a wet carbon dioxide removal process. In some conventional wet carbon dioxide removal processes heat is required for regeneration of the absorbent liquid and this heat is normally obtained by heat recovery from the process or synthesis gas in a step wherein cooling is required, e.g. from the outlet gas from the secondary reforming stage, shift stage (or between shift steps where the shift stage comprises more than one step as is the case with the conventional high temperature shift/low temperature shift sequence), methanation stage, or from the synthesis gas after ammonia synthesis.

However a consequence of reducing the amount of steam employed in the reforming and shift stages by partial bypassing of the externally heated primary reforming stage is that the amount of heat available for carbon dioxide absorbent regeneration is inadequate to effect full regeneration and so, unless the amount of absorbent employed is increased significantly, the amount of carbon dioxide absorbed will be considerably less than is conventional. Also, as a consequence of the reduction in the amount of steam, the shift may be less complete: consequently the process gas leaving the wet carbon dioxide removal stage will contain far more carbon monoxide and dioxide than can economically be removed by methanation. By the use of the PSA stage the carbon monoxide and dioxide contents can be reduced to a level at which methanation is economic.

While it might be possible to use the cryogenic step for removal of the excess of nitrogen as proposed in GB No. 2126208 or U.S. Pat. No. 4,296,085 prior to methanation so that carbon dioxide, as well as nitrogen, is removed, the fact that carbon dioxide is solid at the temperatures required for cryogenic separation of nitrogen necessitates considerable modification to the cryogenic system to avoid blockages of the pipework by solid carbon dioxide, and, further, this would not be a satisfactory modification to existing ammonia plants since it would render the existing wet carbon dioxide removal stage totally redundant.

Thus a preferred form of the present invention provides a process for the production of an ammonia synthesis gas comprising:

(i) reforming a desulphurised hydrocarbon feedstock in an externally heated primary steam reforming stage and in a secondary reforming stage using air with a steam to feedstock carbon ratio of at least 2.5 in the externally heated primary reforming stage and with partial bypass of the externally heated primary reforming stage so that the overall steam to feedstock carbon ratio is between 1.5 and 2.5, thereby producing a process gas containing hydrogen, carbon oxides, steam, nitrogen, and argon, and possibly some methane, and having a hydrogen plus carbon monoxide to nitrogen molar ratio in the range 2.0 to 2.7;

(ii) subjecting said process gas to catalytic shift to convert carbon monoxide to carbon dioxide;

(iii) removing part of the carbon dioxide from the shifted process gas in a wet carbon dioxide removal stage wherein, in one or more absorption steps carbon dioxide is absorbed from the shifted process gas into an absorbent liquid to give a carbon dioxide-loaded absorbent liquid which is then passed to one or more regeneration steps, including stripping of the absorbent liquid, preferably after partial release of carbon dioxide therefrom, with a stripping gas to regenerate the absorbent liquid and the regenerated absorbent liquid is returned to the absorption step or steps;

(iv) removing the bulk of the remaining carbon dioxide together with nitrogen and optionally methane, carbon monoxide, and/or argon, by pressure swing adsorption to give a crude ammonia synthesis gas and waste gas, at least part of which is used as said stripping gas; and (v) purifying the crude synthesis gas by methanation to remove residual carbon oxides;

the amount of nitrogen removed by pressure swing adsorption being such that, after methanation, the resultant purified ammonia synthesis gas has a hydrogen to nitrogen molar ratio in the range 2.7 to 3.1.

The hydrocarbon feedstock can in principle be any that can be vaporised and that can be desulphurised thoroughly enough to permit catalytic reaction with steam. Usually it has a boiling point under 220° C. and preferably it is normally gaseous. Natural gas is preferred.

In the externally heated primary reforming step the inlet temperature is typically in the range 200°–600° C., especially 350°–450° C., and the reactants can conveniently be brought to this inlet temperature by heat exchange with the outlet gas from the secondary reforming stage, and/or by heat exchange with primary reformer furnace flue gas. The outlet temperature in the primary reforming stage is preferably in the range 650°–850° C., especially 750°–830° C. The primary reforming stage is conveniently effected by passing the preheated, desulphurised, feedstock through tubes containing a suitable catalyst, usually nickel on a refractory support, while heating the tubes in a furnace. In a preferred process, the external heating of the primary reforming stage is by heat exchange with the secondary reformer outlet gas.

Where the feedstock is naphtha, it is preferred to employ an adiabatic reforming stage before or after the externally heated primary reforming stage and before the secondary reforming stage, and to add the additional feedstock, preferably preheated, and optionally additional steam, to the reformed gas leaving the externally heated primary reforming stage.

The pressure in the primary reforming stage or stages is typically in the range 10–80 bar abs. The steam ratio, reaction pressure, and outlet temperature are preferably such that the gas from the externally heated primary reforming stage contains 7 to 20% v/v of methane on a dry basis.

In the preferred process the gas from the primary reforming stage or stages is fed to a secondary reformer to which air is also supplied. In the preferred process using natural gas as the feedstock, additional desulphurised, preferably preheated, feedstock is added to the primary reformed gas so that the primary reformed gas, plus additional feedstock, react with oxygen from the air in the secondary reformer. The secondary reforming reaction generally is effected in the presence of a secondary reforming catalyst, usually supported nickel. The amount of additional feedstock employed, i.e. fed to the secondary reformer or to an intermediate adiabatic primary reforming stage, is preferably such that the overall steam ratio is within the range 1.5–2.5, preferably 1.8 to 2.3. While additional steam may be fed to the secondary or adiabatic reformer, thereby permitting a greater proportion of the feedstock to bypass the externally heated primary reformer, this is not preferred. The proportion of feedstock bypassing the externally heated primary reforming stage is preferably 10–50% of the total feedstock employed.

The amount of air introduced into the secondary reformer is preferably such as to give a secondary reformer outlet gas having a methane content below 5%, particularly 0.5 to 2% v/v on a dry basis. To achieve this the amount of air required is such that the molar ratio of hydrogen plus carbon monoxide to nitrogen in the secondary reformer outlet gas is normally in the range 1.8 to 2.6. Since the air employed also contains argon, and some methane is unconverted, the secondary reformer outlet gas contains methane and argon in addition to hydrogen, carbon oxides, nitrogen, and steam. It is preferred that the reforming conditions are such that the molar ratio of hydrogen plus carbon monoxide to methane plus argon plus nitrogen in the secondary reformer outlet gas is in the range 1.7 to 2.5 and that nitrogen represents at least 80% v/v of the total of nitrogen, argon, and methane.

The outlet temperature of the secondary reformer gas is typically in the range 850°–1000° C. This gas is then cooled, by heat exchange to preheat reactants and/or raising steam, and then subjected to the catalytic shift reaction. While the normal "high temperature shift" (inlet temperature 260°–360° C.), "low temperature shift" (inlet temperature 160°–250° C.) sequence may be adopted, as a consequence of the reduced overall steam content in some cases it is not possible to use the normal iron oxide/chrome oxide high temperature shift catalyst, since there may be insufficient steam to prevent reduction of the iron oxide to iron. It is therefore preferred that, as described in GB-A-2087855 a copper/zinc oxide/chromium oxide catalyst is used for any high temperature catalytic shift reaction. Alternatively water can be injected into the secondary reformer outlet gas to cool it and to increase the proportion of steam in the gas fed to the shift stage. The overall shift reaction should be such as to reduce the carbon monoxide content of the process gas to below 1% preferably below 0.5% v/v on a dry basis.

After the shift stage residual steam may be condensed by cooling the process gas. However since the amount of steam present will generally be small, residual steam in some cases can conveniently be removed in the wet carbon dioxide removal stage.

In the wet carbon dioxide removal stage the process gas is contacted with a liquid absorbent. This may be an aqueous potassium carbonate solution or a liquid that absorbs carbon dioxide when at an elevated pressure and releases the carbon dioxide when the pressure is reduced. Examples of such liquids are t-amines e.g. methyl diethanolamine, or triethanolamine; tetra methylene sulphone; methanol; N-methylpyrrolidene; propylene carbonate; and polyethylene glycol dialkyl ethers. With potassium carbonate solutions, and to a lesser extent with the pressure sensitive absorbents, the absorbent is normally regenerated by heating. In the preferred process of the invention, as a result of the reduced amount of steam employed in the reforming stages, there is less heat available than is normal for regeneration of the absorbent.

The process gas stream entering the wet carbon dioxide removal stage is normally hot and is cooled by the absorbent liquid so that it leaves the wet carbon dioxide removal stage at a temperature lower than its inlet temperature. It is preferred that this heat transferred from the process gas stream is the only heat imported into the wet carbon dioxide removal stage. In the process of the invention the wet carbon dioxide removal stage is followed by the PSA stage. The latter generally requires a cool inlet gas, typically at a temperature below 50° C., preferably below 45° C. Normally the temperature of the process gas leaving the wet carbon dioxide removal stage is not so low as this. In the process of the invention, wherein PSA waste gas, which is cool, is used to strip the liquid absorbent during the regeneration thereof, this stripping with cool PSA waste gas may also serve to cool the liquid absorbent. Thus, unlike conventional wet carbon dioxide removal processes wherein heat, in addition to that in the process gas stream, is imported into the wet carbon dioxide removal stage, additional heat import is undesirable in the present invention since the wet carbon dioxide removal stage may be required to provide a greater cooling function than in conventional processes.

In the absorption stage or stages of the wet carbon dioxide removal process, the process gas preferably passes up a packed column down through which the regenerated absorbent is flowing. As is well known in the art, lean, i.e. regenerated, absorbent may be introduced at the top of the column and semi-lean, i.e. partially regenerated, absorbent may be introduced partway down the column. The "fat", i.e. carbon dioxide-loaded, absorbent recovered from the bottom of the absorption column is normally hotter than the lean, or semi-lean, absorbent fed to the column as a result of heat transferred from the process gas and, in some cases, as a result of the heat produced on absorption of the carbon dioxide.

The recovered fat absorbent is then passed to the regeneration stage or stages. The latter is preferably conducted in two or more stages in the first of which carbon dioxide is normally flashed from the fat absorbent by reducing the pressure thereof to give a partially regenerated absorbent. Some of this partially regenerated absorbent may be recycled, after re-pressurisation, and cooling if desired, to the absorber column as the semi-lean absorbent, while the rest is passed to one or more further regeneration stages which include stripping with PSA waste gas. Since the latter will generally be at a relatively low pressure, normally less than 10 bar abs., while, in order to avoid the necessitity for compression of the process gas between the wet carbon dioxide removal stage and the PSA stage, the process gas will normally be at a significantly higher pressure, normally at least 20 bar abs., it is generally necessary to let down the pressure of the absorbent liquid prior to the stripping stage to below the PSA waste gas pressure. As mentioned above, this pressure let down is preferably effected before or during a first regeneration stage wherein absorbed carbon dioxide is flashed off.

In order to obtain adequate stripping the stripping gas must have a low carbon dioxide content. Provided a sufficient quantity of gas, other than carbon dioxide, is removed from the process gas stream in the PSA stage, a gas suitable for stripping can be obtained. Thus in the aforesaid preferred process, where the PSA stage removes the excess of nitrogen, and optionally also other impurities such as methane as well as the bulk of any residual carbon dioxide, the carbon dioxide content of the PSA waste gas is low enough to obtain adequate stripping as well as cooling of the absorbent liquid. Where the PSA process separates significant amounts of carbon dioxide, it is in some cases possible to operate the PSA process to give two PSA waste gas streams, one relatively rich in carbon dioxide and one relatively carbon dioxide-lean. In this case only the carbon dioxide-lean stream should be used as stripping gas. The carbon dioxide-rich stream may however be used, via a suitable heat exchanger, to assist cooling of the absorbent during or after regeneration. A PSA process producing relatively carbon dioxide-rich and -lean waste gas streams is disclosed in European patent application No. 85307169.4 (equivalent to U.S. Ser. No. 786008). Thus the PSA process may be operated with depressurisation-to-exterior at a plurality of pressure levels: at the upper level or levels, a relatively carbon dioxide-lean waste gas is produced which is suitable as the stripping gas.

It will be appreciated that, where the PSA stage also removes carbon dioxide, these two carbon dioxide removal stages are in effect in a balance: the greater the amount of carbon dioxide removed in the wet stage, the less there has to be removed in the PSA stage: however the more carbon dioxide that has to be removed in the wet stage, the greater is the requirement for regeneration. Providing the PSA stage removes a substantial amount of gas in addition to carbon dioxide from the process gas, as is the case in the aforementioned preferred ammonia synthesis gas production process, there will be an adequate supply of PSA waste gas of sufficiently low carbon dioxide content to be effective as a stripping gas where the proportion of the carbon dioxide removed in the wet carbon dioxide removal stage is only 40 to 90, particularly 70 to 80% v/v of the total carbon dioxide in the process gas and the bulk of the remainder is removed in the PSA stage, leaving only a small proportion for removal by methanation.

It will further be appreciated that where carbon dioxide is also removed in the PSA stage, since it is not necessary to attain, in the wet carbon dioxide removal stage, such complete carbon dioxide as is normal, regeneration of the liquid absorbent need not be so complete as in conventional wet carbon dioxide removal practice. This means that, for example, the volume of absorbent employed for a given process gas throughput can be reduced, or, conversely, the process gas throughput of an existing wet carbon dioxide removal stage can be increased.

As mentioned hereinbefore, in some cases steam in the raw gas does not have to be condensed and the resultant liquid water removed prior to the wet carbon dioxide removal process: this is because water will generally be removed, together with carbon dioxide in any flash regeneration step and also the PSA waste gas will generally be relatively dry and will become saturated with water vapour as it is used for stripping. Hence a water balance in the wet carbon dioxide removal process may be established in some cases without the need for removal of water from the raw gas, particularly in the preferred process for making ammonia synthesis gas where the overall steam ratio in the reforming and shift stages is low.

In the preferred process, the process gas after the wet carbon dioxide removal stage contains hydrogen, nitrogen, argon, methane, and carbon oxides, of which the bulk is carbon dioxide.

The process gas is then subjected to a pressure swing adsorption stage wherein the bulk of the residual carbon dioxide, together with the excess of nitrogen over that required in the ammonia synthesis, methane, some carbon monoxide and some argon are removed. A suitable pressure swing adsorption process is described in EP-A-157480. In this process a small amount of hydrogen is also separated with the carbon dioxide, excess of nitrogen, etc: this hydrogen containing waste gas can be used, after its use for stripping the carbon dioxide-loaded absorbent liquid, as fuel, e.g. as part of the fuel employed to heat the primary reformer.

After removal of carbon dioxide in the pressure swing adsorption stage, the crude ammonia synthesis gas is subjected to a conventional methanation step to decrease the residual carbon oxides to such a level that there will be no significant deactivation of the ammonia synthesis catalyst. Since hydrogen is consumed in the methanation stage (which is normally effected using a nickel catalyst), the amount of nitrogen removed in the pressure swing adsorption stage should be adjusted to compensate for this usage of hydrogen in methanation.

The purified ammonia synthesis gas is then fed to the ammonia synthesis loop. Any compression required may be effected before or after methanation. Drying of the synthesis gas (to remove water formed during the methanation stage) should be effected before the synthesis gas contacts the ammonia synthesis catalyst. The synthesis loop itself may incorporate a drier, particularly where some or all of the ammonia is recovered by scrubbing with water, and so the purified, but water-containing, synthesis gas is conveniently fed to the loop at a point downstream of the synthesis reactor but upstream of a drier: alternatively where ammonia is removed by refrigeration, the water in the purified synthesis gas may be removed in such a refrigeration step.

As a result of incomplete separation in the pressure swing adsorption stage and the production of methane in the methanation stage, the purified synthesis gas contains some argon and methane. Hence a small purge from the synthesis loop will be necessary to prevent an unacceptable build up of inerts in the loop. Such a purge will also result in a loss of hydrogen and nitrogen from the loop. Where the purified synthesis gas has a hydrogen:nitrogen ratio significantly below 3, e.g. below 2.9, a considerable amount of hydrogen has to be vented as part of the purge along with the excess of nitrogen. It is preferred that, at least where the hydrogen:nitrogen ratio of the purified synthesis gas is below 2.9, at least part of the purge is subjected to a hydrogen recovery process and the recovered hydrogen is recycled to the synthesis loop. Hydrogen recovery and recycle is described in, for example, GB-A-1057020, 1274504, 1280194, 1460681 and EP-A-993. The amount of nitrogen removed in the pressure swing adsorption stage should therefore be adjusted to compensate for the nitrogen lost in such a purge and the extent, if any, of hydrogen recovery and recycle from the purge.

One advantage of the present invention is that, by the addition of a pressure swing adsorption unit, conventional ammonia synthesis plants can be upgraded, to give an increased output and/or more economic operation, with only minor other changes to the plant.

Other applications of the invention include combination processes including upstream and downstream stages as described, whether as new installations or as modifications of existing installations. Such modifications are increasingly adopted in order to improve efficiency or output or merely to replace parts of plants that are wearing out. Specific examples of such modifications are as follows:

I. Replacement of the cryogenic purifier in the "Braun" process as described in GB Nos. 1156002 and 1156003. As a result the pressure-loss due to the adiabatic expansion is avoided and (if required) replacement of chemical $CO_2$-removal by physical $CO_2$-removal is facilitated;

II. Introduction of excess-air secondary reformering into conventional ammonia production plants, thus decreasing fuel consumption in the primary reformer;

III. Replacement of the reformer and secondary reformer by a single stage adiabatic air/steam reformer, while retaining energy recovery from hot reformer gas by steam-raising;

IV. Replacement of the conventional fired primary reformer and the secondary reformer by a combination reformer in which the heat input for primary reforming is supplied by heat exchange with secondary reformer gas. By this means the heat recovery is internal to the reforming stages and the conventional steam system is not appropriate.

In each of cases II, III and IV an additional advantage of the modification is that the product gas contains less non-reactive gas than before, and hence the partial pressure of reactive gases is higher, the synthesis reaction is more complete and loss by purging is less.

In any process according to the invention the off-gas from stripping often contains sufficient combustible gas to be used as fuel and can be augmented by adding other fuel gases such as synthesis purge gas or reforming feedstock hydrocarbon. The fuel mixture is preferably let down, preferably after combustion, in an engine, especially in modifications III or IV above in which there is less heat recovery as steam. When stripping of the carbon dioxide-loaded absorbent liquid follows bulk carbon dioxide desorption thereof by pressure let-down, the stripping off-gas is a very convenient fuel because of its low carbon dioxide content.

Where the raw gas contains hydrogen, carbon dioxide, and intermediate boiling point gas and removal of that intermediate boiling point gas is not required, the PSA waste gas, after use for stripping, may be returned to the raw gas upstream of the wet carbon dioxide removal stage. In this case the net effect is that all the carbon dioxide removal is effected in the wet stage even though the process gas leaving the wet carbon dioxide removal stage may have a significant carbon dioxide content. Such a process is advantageous where modifications are undertaken to a plant that is not restricted in its wet carbon dioxide removal stage capacity but which modifications reduce the amount of heat available and so necessitate change from the conventional heat-utilising absorbent liquid regeneration. Where only part removal of intermediate boiling gas from the raw gas is required, part of the PSA waste gas may be recycled as aforesaid to the raw gas upstream of the wet carbon dioxide removal stage.

If the wet carbon dioxide removal capacity is adequate to provide a process gas of the conventional low carbon dioxide content (below about 0.5% v/v) and the carbon monoxide content of the raw gas is low, then methanation of the process gas after wet carbon dioxide removal but prior to the PSA stage may be economically employed. This has the advantage of giving a PSA waste gas of negligble carbon dioxide content that is a very effective stripping gas. If such a process is used to produce an ammonia synthesis gas, the PSA conditions may be arranged to give a product gas of nitrogen and hydrogen in the desired ratio with minimal methane and argon content. In this way the purge from the downstream ammonia synthesis loop may be made very small, with the consequence of minimum hydrogen loss. Indeed no purge may be necessary as some unreacted synthesis gas will normally involuntarily be purged—and so avoid build up of any argon and methane not removed in the PSA stage—by dissolution in the ammonia product. However such a process involving methanation between the wet carbon dioxide removal stage and the PSA stage has the disadvantage that the process gas has to be heated to the methanation inlet temperature and then cooled prior to the PSA stage. While methanation feed/effluent heat exchange is preferably employed thus avoiding any heat import, some of the benefit of the cooling given by the wet carbon dioxide removal stage will inevitably be lost.

The accompanying drawing is a flow sheet of one embodiment of the invention.

In this embodiment an ammonia synthesis gas is prepared from a cooled shifted raw gas at e.g. 40 bar abs pressure containing hydrogen, nitrogen in an excess of that required in the ammonia synthesis gas, carbon dioxide, and small percentages of carbon monoxide, methane, argon and residual water vapour. The raw gas is fed at 10 and united at 12 with a recycled flash gas to be described. The mixture is fed into absorber 14 in which, on packing 16, it contacts "SELEXOL38 (RTM) liquid absorbent (dialkyl ether of polyethylene glycol) fed in at 18. Gas depleted in carbon dioxide passes overhead to methanator 20, which includes a feed/effluent heat exchanger, a bed of supported nickel methanation catalyst, cooler, and water separator and at 250°-350° C. converts residual carbon oxides very thoroughly to methane and water. The methanated gas is passed to PSA system 22, which includes a plurality of adsorption beds of molecular sieve and active carbon under the control of programmed valves so as to provide continuous purified ammonia synthesis gas stream 24, to effect depressurisation, equalisation and purge steps, and to release waste gas 26 containing methane, superfluous nitrogen, argon, and small quantities of hydrogen. Further treatment of waste gas 26 will be described below.

The carbon dioxide-loaded absorbent is discharged from the bottom of absorber 14 and is let down with power recovery in turbine 28 and passed into first flash vessel 30 at a pressure of for example 10-25 bar abs. Here dissolved hydrogen, nitrogen, carbon monoxide, methane and argon flash off, but very little carbon dioxide and, since the hydrogen and nitrogen are valuable products, the off-gas is fed to compressor 32 and recycled back to the absorber inlet at 12. The absorbent is let down to for example 1-5 bar abs and passed into second flash vessel 34, from which the bulk of its carbon dioxide flashes off at 36 and is fed to a carbon dioxide user such as a urea plant. The carbon dioxide-depleted absorbent is now pumped to the top of regenerator 40, in which it falls through packing 42 in counter-current with rising PSA waste gas from point 26, which gas is passed in at 44. The waste gas strips substantially all the remaining carbon dioxide from the absorbent, which is now pumped back to point 18 on absorber 14. The mixture of carbon dioxide and PSA waste gas is passed out at 46 for use as fuel and may conveniently be used in a mixed-fluid gas turbine.

In an alternative process using methyldiethanolamine (MDEA) as absorbent, it is unnecessary to use compressor 32 and the recycle to point 12, because the solubility of hydrogen is less; instead, the flash gas may be united with fuel gas 46. When using MDEA it is preferred that the temperature of the absorbent leaving absorber 14 is from 60°-80° C., in order to obtain good carbon dioxide removal. The absorbent leaving regenerator 40 may be heated to the desired temperatures for carbon dioxide removal by heat exchange with the loaded absorbent leaving flash vessel 34.

An example of the process of the invention using the above flow sheet but modified by the ommission of the pre-PSA methanation step 20 is given below.

This example uses a feed gas 10 cooled before the wet carbon dioxide removal stage to 30° C. and "SELEXOL" as the liquid absorbent. The feed gas 10 contains about 2% v/v water vapour: this will be removed in the wet carbon dioxide removal step and/or the PSA stage. In the following table, which shows the gas flows at various points, water vapour has been omitted.

| Gas stream | Pressure (bar abs) | Gas flow (kg mol/hr) | | | | | |
|---|---|---|---|---|---|---|---|
| | | $H_2$ | $N_2$ | $CO_2$ | CO | $CH_4$ | Ar |
| 10 | 28.6 | 4073.2 | 1709.9 | 1244.0 | 28.2 | 201.6 | 20.1 |
| 22 inlet | 28.6 | 4069.0 | 1705.6 | 36.5 | 28.2 | 199.6 | 20.1 |
| 24 | 28.6 | 3828.8 | 1276.3 | — | 0.5 | 1.0 | 16.1 |
| 26 | 2.0 | 240.2 | 429.3 | 36.5 | 27.2 | 198.9 | 4.0 |
| 36 | 2.0 | 4.2 | 3.4 | 847.2 | — | 1.7 | — |
| 46 | 2.0 | 240.2 | 429.3 | 396.8 | 27.7 | 198.9 | 4.0 |

The product gas 24 will also contain about 5 ppm, by volume, of carbon dioxide.

The feed gas 10 may be made as follows using desulphurised natural gas of the following approximate volume composition

| methane | 89.0% |
|---|---|
| $C_2$-$C_4$ hydrocarbons | 6.1% |
| nitrogen | 1.7% |
| carbon dioxide | 0.5% |
| hydrogen | 2.7% |

The desulphurised natural gas is preheated and fed, at 40 bar abs. and at a rate of 957.1 kg mol/hr, together with steam, using a steam-to-hydrocarbon carbon molar ratio of 3, over a nickel catalyst supported on an inert support disposed in tubes in an externally heated primary steam reformer with a catalyst outlet temperature of 780° C. To this primary reformed gas a further stream of preheated desulphurised natural gas is added at a rate of 478.6 kg mol/hr and the mixture fed to a secondary reformer wherein it is combusted with air (containing about 7.3% v/v steam) fed at a rate of 2326.3 kg mol/hr and the combustion products fed over a supported nickel catalyst to effect secondary reforming with an outlet temperature of 894° C. The secondary reformed gas has the approximate volume composition:

| $CH_4$ | 2.3% |
|---|---|
| CO | 9.4% |
| $CO_2$ | 5.1% |
| $H_2O$ | 26.2% |
| $H_2$ | 37.3% |
| $N_2$ | 19.5% |
| Ar | 0.2% | and thus has a

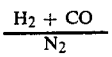

ratio of 2.4. The overall steam:hydrogen carbon molar ratio in the reforming stages is about 2.1.

The reformed gas is cooled, with heat recovery, and subjected to the conventional high temperature/low temperature shift sequence with heat recovery between the two stages. The shift temperatures are

|  | Inlet (°C.) | Outlet (°C.) |
| --- | --- | --- |
| High temperature | 350 | 420 |
| Low temperature | 190 | 220 |

The shifted gas is then cooled to 30° C., with heat recovery, to condense the excess steam and the liquid water is removed to give the feed gas 10.

I claim:

1. A process for producing a purified ammonia synthesis gas stream from a raw gas stream consisting essentially of hydrogen, carbon dioxide, nitrogen in an excess of that required in the ammonia synthesis gas and, optionally other gas selected from at least one of argon, methane, and carbon monoxide, said raw gas having a carbon monoxide content of less than 1% by volume on a dry basis, comprising
    (a) removal of carbon dioxide from the raw gas stream in a wet carbon dioxide removal stage wherein, in one or more adsorption steps, carbon dioxide is absorbed from the raw gas into an absorbent liquid to give a carbon dioxide-loaded adsorbent liquid which is then passed to one or more regeneration steps wherein adsorbed carbon dioxide is separated from the carbon dioxide-loaded adsorbent liquid thereby regenerating said adsorbent liquid which is returned to the adsorption step or steps, and
    (b) removal of the excess of nitrogen, the bulk of any residual carbon dioxide, and optionally at least part of said other gas by a pressure swing adsorption stage, and
    (c) methanation, before or after the pressure swing adsorption stage, to convert any remaining carbon oxides to methane.
    whereby to produce the required ammonia synthesis gas stream and waste gas from the pressure swing adsorption stage,
    and wherein, in at least one of said one or more regeneration steps, the carbon dioxide-loaded adsorbent liquid is contacted with at least part of said waste gas so that the latter strips carbon dioxide from said carbon dioxide-loaded adsorbent liquid to give the regenerated adsorbent liquid.

2. A process according to claim 1 wherein part of the carbon dioxide in the raw gas is removed in the wet carbon dioxide removal stage and the bulk of the remainder is removed in the pressure swing adsorption stage.

3. A process according to claim 2 wherein 40 to 90% of the carbon dioxide in the raw gas is removed in the wet carbon dioxide removal stage.

4. A process according to claim 1 wherein the wet carbon dioxide removal stage is operated to give a gas stream having a carbon dioxide content below 0.5% v/v and the resultant carbon dioxide depleted stream is methanated prior to the pressure swing adsorption stage.

5. A process according to claim 1 wherein no heat, save that in the raw gas, is imported into the wet carbon dioxide removal stage.

6. A process according to claim 11 wherein said raw gas stream is produced by a process comprising
    (i) reforming a desulphurised hydrocarbon feedstock in an externally heated primary steam reforming stage and in a secondary reforming stage using air, thereby producing a process gas containing hydrogen, carbon oxides, steam, nitrogen, argon, and methane, and having a hydrogen plus carbon monoxide to nitrogen molar ratio in the range 2.0 to 2.7 and
    (ii) subjecting said process gas to catalytic shift to convert carbon monoxide to carbon dioxide;
    the amount of nitrogen removed by pressure swing adsorption being such that, after methanation, the purified synthesis gas has a hydrogen to nitrogen molar ratio in the range 2.7 to 3.1.

7. A process according to claim 6 wherein the reforming of the hydrocarbon feedstock is operated with a steam to feedstock carbon ratio of at least 2.5 in the externally heated primary reforming stage and with partial bypass of the externally heated primary reforming stage so that the overall steam to hydrocarbon feedstock carbon ratio is between 1.5 and 2.5.

8. A process according to claim 6 wherein, in the secondary reformer outlet gas, the molar ratio of hydrogen plus carbon monoxide to methane plus argon plus nitrogen is in the range 1.7 to 2.3 and the nitrogen represents at least 80% v/v of the total of nitrogen, argon, and methane.

9. A process according to claim 1 wherein some carbon dioxide is removed in the pressure swing adsorption stage and the latter is operated so as to give a first waste gas stream that is relatively lean in carbon dioxide and a second waste gas stream that is relatively rich in carbon dioxide and only said first waste gas stream is used for stripping the loaded absorbent liquid.

10. A process according to claim 1 wherein the regeneration of the loaded absorbent liquid includes flashing carbon dioxide therefrom prior to stripping with waste gas from the pressure swing adsorption stage.

11. A process for producing a hydrogen-containing gas stream from a raw gas stream comprising hydrogen, carbon dioxide, and other gas of intermediate boiling point wherein carbon dioxide is removed from the raw gas stream in a wet carbon dioxide removal stage wherein, in at least one absorption step, carbon dioxide is absorbed from the raw gas into an absorbent liquid to give a carbon dioxide-loaded absorbent liquid which is then passed to at least one regeneration step wherein absorbed carbon dioxide is separated from the carbon dioxide-loaded absorbent liquid thereby regenerating said absorbent liquid which is returned to said at least one absorption step, characterised by:
    (a) removing at least part of said other gas by a pressure swing adsorption process whereby to produce the required hydrogen-containing gas stream and waste gas, and
    (b) in at least one regeneration step, contacting the carbon dioxide-loaded absorbent liquid with at least part of said waste gas so that the latter strips carbon dioxide from said carbon dioxide-loaded absorbent liquid to give the regenerated absorbent liquid.

* * * * *